United States Patent
Peterson

(10) Patent No.: US 8,885,798 B2
(45) Date of Patent: *Nov. 11, 2014

(54) SYSTEMS AND METHODS FOR PRESENTING END TO END CALLS AND ASSOCIATED INFORMATION

(75) Inventor: Patrick M. Peterson, Cambridge, MA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 196 days.

This patent is subject to a terminal disclaimer.

(21) Appl. No.: 13/356,334

(22) Filed: Jan. 23, 2012

(65) Prior Publication Data

US 2012/0173229 A1 Jul. 5, 2012

Related U.S. Application Data

(63) Continuation of application No. 11/063,759, filed on Feb. 22, 2005, now Pat. No. 8,102,973.

(51) Int. Cl.
 *H04M 1/64* (2006.01)
 *H04M 3/487* (2006.01)
 *H04M 3/51* (2006.01)
 *H04M 3/36* (2006.01)

(52) U.S. Cl.
 CPC ............ *H04M 3/487* (2013.01); *H04M 3/5175* (2013.01); *H04M 3/5191* (2013.01); *H04M 3/36* (2013.01); *H04M 3/5166* (2013.01)
 USPC ..................... 379/88.09; 379/88.11

(58) Field of Classification Search
 USPC ............................................. 379/88.08–88.14
 See application file for complete search history.

(56) References Cited

U.S. PATENT DOCUMENTS

| 5,535,256 A | 7/1996 | Maloney et al. |
| 5,946,375 A | 8/1999 | Pattison et al. |

(Continued)

FOREIGN PATENT DOCUMENTS

GB 2478916 A 9/2011

OTHER PUBLICATIONS

"NICE Introduces New Real-time PCI Solution for Payment Card Industry Compliance" (Press release). Nice Systems Ltd. Jan. 12, 2011. Web. Retrieved Jun. 18, 2012 from <<http://www.nice.com/content/nice-introduces-new-real-time-pci-solution-payment-card-industry-compliance>>.

(Continued)

*Primary Examiner* — Joseph T Phan
(74) *Attorney, Agent, or Firm* — Ropes & Gray LLP

(57) ABSTRACT

Systems and methods that, among other things, analyze and monitor the performance of a call center including performance of the interactive voice response (IVR) systems, call center agents, and other components of the call center. The systems and methods record characteristics of the call such as the audio data, and analyze that record to identify the events and the actions that take place during the call. A call center administrator may also identify a set of metrics, such as the number of dropped calls that occur during a day that may be monitored by the systems described herein. The data collected about these events and the resulting metrics may be stored in a database and provided to a call center administrator through a user interface that allows the administrator to browse through the collected metric and recorded call data and directly review relevant portions of a call.

24 Claims, 13 Drawing Sheets

(56) References Cited

U.S. PATENT DOCUMENTS

| | | | |
|---|---|---|---|
| 6,047,060 A | 4/2000 | Fedorov et al. | |
| 6,263,049 B1 | 7/2001 | Kuhn | |
| 6,408,064 B1 | 6/2002 | Fedorov et al. | |
| 6,683,947 B2 | 1/2004 | Roelle et al. | |
| 6,707,904 B1 | 3/2004 | Judkins et al. | |
| 6,763,104 B1 | 7/2004 | Judkins et al. | |
| 6,785,369 B2 | 8/2004 | Diamond et al. | |
| 6,785,370 B2 | 8/2004 | Glowny et al. | |
| 6,804,638 B2 | 10/2004 | Fiedler | |
| 6,810,111 B1 * | 10/2004 | Hunter et al. | 379/1.02 |
| 6,823,054 B1 * | 11/2004 | Suhm et al. | 379/134 |
| 6,937,705 B1 * | 8/2005 | Godfrey et al. | 379/88.18 |
| 7,293,279 B1 | 11/2007 | Asmussen | |
| 7,310,517 B2 | 12/2007 | Wolff et al. | |
| 7,881,440 B2 * | 2/2011 | Castillo et al. | 379/29.1 |
| 7,933,408 B2 | 4/2011 | Wong et al. | |
| 8,005,202 B2 * | 8/2011 | Agapi et al. | 379/201.03 |
| 8,028,076 B2 | 9/2011 | Abzarian et al. | |
| 8,031,858 B2 | 10/2011 | Miller et al. | |
| 8,121,264 B1 | 2/2012 | Hogg, Jr. et al. | |
| 8,370,919 B2 | 2/2013 | Abzarian et al. | |
| 2002/0178001 A1 | 11/2002 | Balluff et al. | |
| 2003/0040917 A1 | 2/2003 | Fiedler | |
| 2003/0088413 A1 * | 5/2003 | Gomez | 704/246 |
| 2003/0112958 A1 * | 6/2003 | Beaudoin et al. | 379/221.15 |
| 2004/0121790 A1 | 6/2004 | Wolff et al. | |
| 2004/0131161 A1 | 7/2004 | Schwartz et al. | |
| 2005/0114116 A1 | 5/2005 | Fiedler | |
| 2006/0188075 A1 | 8/2006 | Peterson | |
| 2006/0198504 A1 | 9/2006 | Shemisa et al. | |
| 2007/0155415 A1 | 7/2007 | Sheehy et al. | |
| 2007/0263603 A1 | 11/2007 | Schmitt | |
| 2010/0169944 A1 | 7/2010 | Rondeau et al. | |

OTHER PUBLICATIONS

"Made in IBM Labs: IBM Technology to Protect Customer Data in the Call Center Industry" (Press release). IBM. Jul. 3, 2008. Web. Retrieved Jun. 18, 2012 from < <http://www-03.ibm.com/press/us/en/pressrelease/24567.wss>>.

* cited by examiner

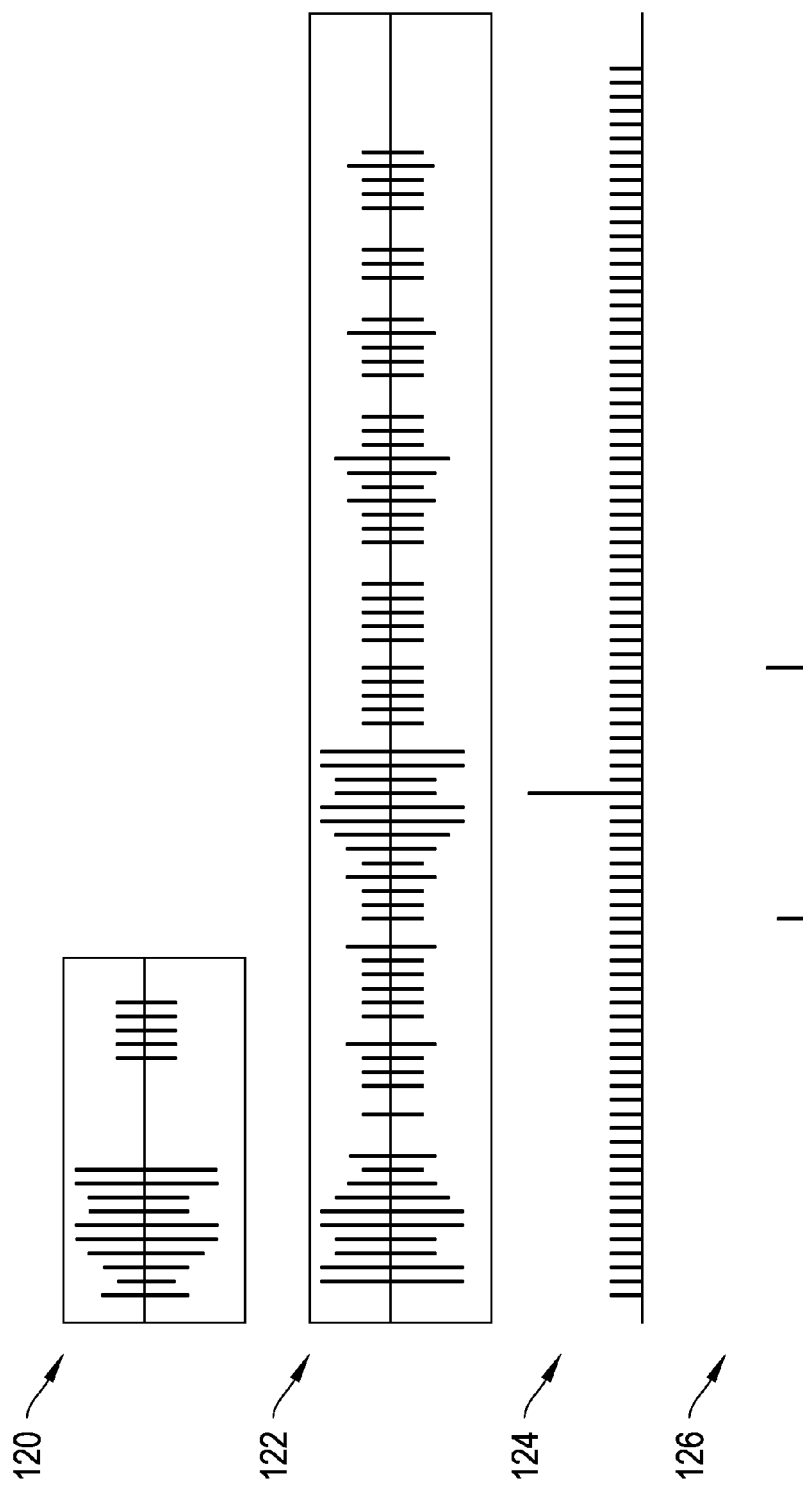

Welcome, Medicare,

Since recording began, we have captured a total of 3400 calls, over 34 weeks, starting on 12/15/04.

For the current recording setup, we have captured a total of 400 calls, over 4 weeks, starting on 6/5/05.

Call recording is scheduled to continue until 8/31/05.

The call database contains information on all calls since recording began.

You can listen to any call recorded in the last 6 months.

Select the data you wish to browse:

| DNIS | Date | Day | Hours | # of calls |
|---|---|---|---|---|
| 800-633-2273 | 11/26/2004 | Fri | Open | 20 |
| 800-633-2273 | 11/27/2004 | Sat | Open | 11 |
| 800-633-2273 | 11/28/2004 | Sun | Open | 5 |
| 800-633-2273 | 11/29/2004 | Mon | Open | 23 |
| 800-633-2273 | 11/30/2004 | Tue | Open | 22 |
| 800-633-2273 | 12/1/2004 | Wed | Open | 19 |
| 800-633-2273 | 12/2/2004 | Thu | Open | 18 |
| 800-633-2273 | 12/3/2004 | Fri | Open | 17 |
| 800-633-2273 | 12/4/2004 | Sat | Open | 8 |
| 800-633-2273 | 12/5/2004 | Sun | Open | 5 |
| 800-633-2273 | 12/6/2004 | Mon | Open | 26 |
| 800-633-2274 | 11/26/2004 | Fri | Open | 24 |
| 800-633-2274 | 11/27/2004 | Sat | Open | 10 |
| 800-633-2274 | 11/28/2004 | Sun | Open | 6 |
| 800-633-2274 | 11/29/2004 | Mon | Open | 22 |
| 800-633-2274 | 11/30/2004 | Tue | Open | 21 |
| 800-633-2274 | 12/1/2004 | Wed | Open | 21 |
| 800-633-2274 | 12/2/2004 | Thu | Open | 17 |

Browse

Fig. 6

Welcome, Medicare,

Since recording began, we have captured a total of 3400 calls, over 34 weeks, starting on 12/15/04.

For the current recording setup, we have captured a total of 400 calls, over 4 weeks, starting on 6/5/05.

Call recording is scheduled to continue until 8/31/05.

The call database contains information on all calls since recording began.

You can listen to any call recorded in the last 6 months.

Select the data you wish to browse:

[Browse]

| DNIS | Date | Day | Hours | # of calls |
|---|---|---|---|---|
| | | | (Sort Up) | |
| | | | (Sort Down) | |
| | | | (All) | |
| | | | (Top 10....) | |
| | | | (Custom...) | |
| 800-633-2273 | 11/26/2004 | Fri | Open | 20 |
| 800-633-2273 | 11/27/2004 | Sat | Closed | 11 |
| 800-633-2273 | 11/28/2004 | Sun | Open | 5 |
| 800-633-2273 | 11/29/2004 | Mon | Open | 23 |
| 800-633-2273 | 11/30/2004 | Tue | Open | 22 |
| 800-633-2273 | 12/1/2004 | Wed | Open | 19 |
| 800-633-2273 | 12/2/2004 | Thu | Open | 18 |
| 800-633-2273 | 12/3/2004 | Fri | Open | 17 |
| 800-633-2273 | 12/4/2004 | Sat | Open | 8 |
| 800-633-2273 | 12/5/2004 | Sun | Open | 5 |
| 800-633-2273 | 12/6/2004 | Mon | Open | 26 |
| 800-633-2274 | 11/26/2004 | Fri | Open | 24 |
| 800-633-2274 | 11/27/2004 | Sat | Open | 10 |
| 800-633-2274 | 11/28/2004 | Sun | Open | 6 |
| 800-633-2274 | 11/29/2004 | Mon | Open | 22 |
| 800-633-2274 | 11/30/2004 | Tue | Open | 21 |
| 800-633-2274 | 12/1/2004 | Wed | Open | 21 |
| 800-633-2274 | 12/2/2004 | Thu | Open | 17 |

Fig. 8

| DNIS | ANI | Date | Day | Hours | Time | Channel | TT Keys | Prompts | IVR Exit | Duration |
|---|---|---|---|---|---|---|---|---|---|---|
| 800-633-2273 | 301-925-1825 | 11/26/2004 | Fri | (Sort Up) | 12:11 AM | 1 | 1-1 | Main, 1-Bill | | 5:00 |
| 800-633-2273 | | 11/26/2004 | Fri | (Sort Down) | 12:01 AM | 2 | 5-2 | Main, 5-Other | 1:34 | 1:45 |
| 800-633-2273 | 410-889-8862 | 11/26/2004 | Fri | (All) | 12:23 AM | 2 | 1-4-1 | Main, 1-Bill, 4-Other | | 2:30 |
| 800-633-2273 | 301-791-6936 | 11/26/2004 | Fri | (Top 10...) | 10:16 PM | 2 | 1-1 | Main, 1-Bill | | 4:30 |
| 800-633-2273 | 301-898-0779 | 11/26/2004 | Fri | (Custom...) | 11:11 PM | 2 | 1-4-3 | Main, 1-Bill, 4-Other | | 9:30 |
| 800-633-2273 | 410-439-5797 | 11/27/2004 | Sat | (Hide) | 9:04 PM | 1 | 1-3 | Main, 1-Bill | 2:45 | 4:30 |
| 800-633-2273 | 410-889-2732 | 11/27/2004 | Sat | Closed | 10:10 PM | 2 | 1-3 | Main, 1-Bill | 1:25 | 3:40 |
| 800-633-2273 | 301-527-9096 | 11/28/2004 | Sun | Closed | 10:00 PM | 2 | 1-3 | Main, 1-Bill | 3:41 | 4:30 |
| 800-633-2273 | 301-262-7073 | 11/29/2004 | Mon | Closed | 2:02 AM | 1 | 1-3 | Main, 1-Bill | 1:23 | 8:35 |
| 800-633-2273 | 410-674-3616 | 11/29/2004 | Mon | Closed | 2:59 AM | 4 | 5-2 | Main, 5-Other | 1:50 | 7:18 |
| 800-633-2273 | 301-391-3961 | 11/29/2004 | Mon | Closed | 3:47 AM | 1 | 1-1 | Main, 1-Bill | 4:09 | 5:35 |
| 800-633-2273 | 301-695-5235 | 11/29/2004 | Mon | Closed | 9:11 PM | 2 | 1-4-2 | Main, 1-Bill, 4-Other | 2:50 | 5:25 |
| 800-633-2273 | | 11/29/2004 | Mon | Closed | 9:43 PM | 2 | 1-3 | Main, 1-Bill | 1:14 | 2:45 |
| 800-633-2273 | 301-333-9768 | 11/30/2004 | Tue | Closed | 10:29 PM | 1 | 5-2 | Main, 5-Other | | 5:00 |
| 800-633-2273 | | 11/30/2004 | Tue | Closed | 12:06 AM | 3 | 1-3 | Main, 1-Bill | | 1:40 |
| 800-633-2273 | 301-780-3625 | 11/30/2004 | Tue | Closed | 1:21 AM | 1 | 1-3 | Main, 1-Bill | 1:25 | 5:00 |
| 800-633-2273 | 410-466-4413 | 11/30/2004 | Tue | Closed | 9:20 PM | 3 | 1-3 | Main, 1-Bill | 1:15 | 3:50 |
| 800-633-2273 | 410-354-0183 | 12/1/2004 | Wed | Closed | 11:39 PM | 4 | 1-1 | Main, 1-Bill | | 5:25 |
| 800-633-2273 | 301-866-9375 | 12/1/2004 | Wed | Closed | 1:31 AM | 2 | 1-4-2 | Main, 1-Bill, 4-Other | 1:29 | 5:20 |
| 800-633-2273 | | 12/1/2004 | Wed | Closed | 3:29 AM | 2 | 1-3 | Main, 1-Bill | 3:19 | 7:19 |
| 800-633-2273 | 410-956-7289 | 12/1/2004 | Wed | Closed | 9:46 PM | 3 | 1-3 | Main, 1-Bill | 1:40 | 2:30 |
| 800-633-2273 | 410-435-3017 | 12/2/2004 | Thu | Closed | 10:22 PM | 3 | 1-3 | Main, 1-Bill | 1:20 | 3:40 |
| 800-633-2273 | 301-567-8851 | 12/2/2004 | Thu | Closed | 11:28 PM | 1 | 1-4-2 | Main, 1-Bill, 4-Other | 2:27 | 7:05 |
| 800-633-2273 | 301-423-1356 | 12/2/2004 | Thu | Closed | 1:14 AM | 4 | 1-3 | Main, 1-Bill | 3:01 | 6:36 |
| 800-633-2273 | 410-642-2143 | 12/2/2004 | Thu | Closed | 2:19 AM | 4 | 1-1 | Main, 1-Bill | 2:36 | 5:21 |
| 800-633-2273 | 410-448-0757 | 12/3/2004 | Fri | Closed | 2:32 AM | 3 | 1-1 | Main, 1-Bill | 1:44 | 6:35 |
| 800-633-2273 | | 12/3/2004 | Fri | Closed | 2:27 AM | 2 | 1-4-1 | Main, 1-Bill, 4-Other | | 3:37 |
| 800-633-2273 | | 12/3/2004 | Fri | Closed | 9:29 PM | 4 | 5-2 | Main, 5-Other | 1:50 | 3:00 |
| 800-633-2273 | 410-398-7092 | 12/3/2004 | Fri | Closed | 10:57 PM | 1 | 1-4-2 | Main, 1-Bill, 4-Other | | 3:40 |
| 800-633-2273 | 410-602-5119 | 12/3/2004 | Fri | Closed | 10:41 PM | 2 | 1-1 | Main, 1-Bill | | 5:45 |
| 800-633-2273 | | 12/3/2004 | Fri | Closed | 10:26 PM | 4 | 5-2 | Main, 5-Other | | 1:00 |
| 800-633-2273 | 410-266-7138 | 12/3/2004 | Fri | Closed | 11:51 PM | 1 | 1-1 | Main, 1-Bill | | 9:07 |

Fig. 11

SYSTEMS AND METHODS FOR PRESENTING END TO END CALLS AND ASSOCIATED INFORMATION

RELATED APPLICATION

This application is a continuation of, and claims priority to, U.S. patent application Ser. No. 11/063,759, filed Feb. 22, 2005, the disclosure of which is incorporated herein by reference.

FIELD

The invention relates to a method and apparatus usable in connection with managing a call center and in particular to a computer-implemented method and apparatus permitting telephone call center personnel to identify and listen to segments of recorded customer calls that contain events of interest.

BACKGROUND

Many businesses and organizations provide call centers in which a plurality of personnel answer calls, such as telephone calls or other inquiries, e.g. from customers or potential customers. Call centers serve a number of functions including facilitating the placement of orders for goods or services, providing information about products or the status of orders, receiving customer complaints or suggestions, dispensing product or technical information to assist customers in selecting or using products or services and the like. Call centers are important departments for many of these businesses and the success of the business often turns, at least in part, on the efficient handling of customer inquiries coming in through the company call center. As such, call center managers are constantly looking for ways to improve center performance.

Unfortunately, call center managers and decision makers in call centers lack adequate information. Standard interactive voice response performance reports do not capture information on usability and lack sufficient detail. Call center managers are often misled to believe that the existing IVR is performing well. Even if they recognize that something is wrong, they cannot identify the specific problems, much less how to remedy them. Without understanding the value of usability and its impact on the business, IVR usability engineering is rarely taken seriously.

Usability design and reengineering know-how for IVRs range from style guides for touch tone IVRs (Hallstad-Nussloch, 1989) to comprehensive collections of best practices for IVR design (Resnick and Virzi, 1995), which also cover state-of-the-art speech enabled IVRs (Valentine and Morgan, 1999). While applying best practices can often improve IVR usability, the measurement and validation of those improvements can be quite difficult, especially in the context of a production IVR with many different tasks and a wide range of callers. When IVR design methods yield different plausible designs, it is often impossible to decide which design works best just by applying guidelines without some form of empirical evaluation.

Thus, there exists a need for systems that allow call center administrators to determine more effectively the cause and source of errors and inefficiencies.

SUMMARY OF THE INVENTION

Systems and methods that, among other things, analyze and monitor the performance of a call center including performance of the interactive voice response (IVR) systems, call center agents, and other components of the call center. The systems and methods record end to end characteristics of the call such as the audio data, and analyze that record to identify the events and the actions that take place during the call. These events and actions may be defined as complex customer/call center interactions, such as dropped calls, logic errors or other events, such as touch tone presses or prompt plays. A call center administrator may also identify a set of metrics, such as the number of dropped calls that occur during a day or for each agent, the number of times a client was left on hold for more than two minutes, or other such metrics that may be monitored by the systems described herein. The data collected about these events and the resulting metrics may be stored in a database and provided to a call center administrator through a user interface that allows the administrator to browse through the collected metric and recorded call data and directly review relevant portions of a call that are of interest to the administrator.

More particularly, the methods described herein include, among other things, a method for generating an annotated log of a call, comprising connecting into a call by coupling into a circuit on the telephone network, recording an audio record of the call, identifying a set of events and associating with each event an audio waveform representative of an occurrence of the event, performing a call analysis to identify within the audio record occurrences of one or more of the identified events, and associating with the audio record with an indicator representative of an occurrence of an identified event within the audio record. Optionally, the methods may further comprise generating a report representative of the events that occurred during the call, and providing a user interface for allowing a user to select an event and the associated call and to playback a portion of the call related to the event, the portion occurring between the marked beginning and end of the event.

In a further optional embodiment, the reports may be generated of the events occurring during a call for a plurality of calls incoming to a call center, and a database made that is representative of many annotated calls. The generated reports may be provided by a browseable user interface for displaying information representative of audio records of calls stored in the database and for displaying the information as an active link to the annotated record of the respective call.

When connecting into a call the systems and methods may forward a call to a recording server having a switch for forwarding the call to a destination, or hook into an observation port provided by telephony equipment at the call center. When recording the call, the methods may record an audio record, including recording voice signals and DTMF tones generated in response to an interactive voice response system. The recorded waveforms may be stored digital representations of the audio. The methods can optionally, generate a graphic display representative of the recorded audio and a set of graphical markers indicating the location of an event within the recorded audio. The recorded audio may be analyzed and to that end the method may identify a waveform representative of an event, including identifying an audio signal representative of the event and storing characteristics of the audio signal. The method may compare stored characteristics of a first audio signal with stored characteristics of a second audio signal to determine a difference for distinguishing between the stored characteristics. In one practice, identifying a waveform includes identifying a compound signal that has at least a first audio component as well as a second audio component, whereby an event is identified by determining the occurrence in the audio record of both the first and the second audio components. When performing a call analysis, the method may correlate an audio waveform of the recorded call to a waveform representative of an event to determine the presence and location of the event within the recorded call. Optionally, the method may annotate a recorded call with markers representative of CTI signals. Marking an audio record may include marking a graphic representation of the audio record, and adding an audio cue to the audio record.

In certain optional practices, the methods described herein include allowing a user to define an event and to identify a pattern characteristic of the event occurring within a recorded call, and allowing a user to add an annotation to a recorded call. The methods may further allow the user to set up an alert triggered as a function of the events occurring in one or more recorded calls. The events selected by the user may include an IVR prompt, a broadcast of music, an elevated volume, silence, a touch tone entry, an agent talking, a change of speaker, identification of a which speaker is active, a change of topic, identification of a topic, or a transcript of the words spoken. The method may generate a record representative of identified events that occurred over a plurality of recorded calls. From the monitored calls and measured performance metrics, the processes may allow changes to the call center operations, including altering an IVR process in response to an analysis of a recorded call.

In another aspect, the invention provides systems for generating an annotated log of a call. These systems may comprise a switch for connecting into a call by coupling into a circuit on the telephone network, a recorder, coupled to the switch and capable of recording an audio record of the call, an event database having stored therein a set of events and associated audio waveforms representative of the event, and a call analyzer for identifying within the audio record an occurrence of one or more of the identified events, and for associating with the audio record an indicator representative of an occurrence of an identified event within the audio record. Optionally, the systems may also include a report generator for generating a report representative of the events that occurred during the call, and providing a user interface for allowing a user to select an event and the associated call and to playback a portion of the call related to the event, the portion occurring between the marked beginning and end of the event. These systems may be realized as systems or tool kits for allowing a call center administrator to generate an annotated log of a call. Such systems may comprise a data recorder capable of coupling to a switch and capable of recording an audio record of the call, an events database having stored therein one or more event representative of patterns that may occur within a recorded audio record and for storing associated audio waveforms representative of the event, a user interface for allowing a user to select a performance metric representative of a measure of usability for a call center and to associate with the performance metric one or more of the stored events, a call analyzer for identifying within the audio record an occurrence of one or more of the identified events, and for associating with the audio record an indicator representative of an occurrence of an identified event within the audio record, and a report generator for generating a report representative of the events that occurred during the call, and providing a user interface for allowing a user to select an event and the associated call and to playback a portion of the call related to the event, the portion occurring between the marked beginning and end of the event.

BRIEF DESCRIPTION OF THE FIGURES

The foregoing and other objects and advantages of the invention will be appreciated more fully from the following further description thereof, with reference to the accompanying drawings, wherein like reference numbers unless otherwise indicated refer to like elements.

FIG. 5 depicts a data flow diagram of one process for analyzing an audio record to identify events occurring within that audio record;

FIG. 6 depicts a user interface providing a view of data maintained by the system depicted in FIG. 1;

FIG. 8 presents an example of a sorting function wherein data is sorted according to information stored within an hour field presented to a user/analyst;

FIG. 11 illustrates a user interface having a sorting function for sorting through the call details presented to the user;

DETAILED DESCRIPTION

To provide an overall understanding of the invention, certain illustrative embodiments will now be described. However, it will be understood by one of ordinary skill in the art that the systems and methods described herein can be adapted and modified for other suitable applications and that such other additions and modifications will not depart from the scope hereof.

The systems and methods described herein include, among other things, systems and methods to analyze and monitor the performance of a call center including performance of the interactive voice response (IVR) systems, call center agents, and other components of the call center. To this end, the systems and methods record a call preferably from end to end, or at least characteristics of the call such as the audio data, and analyze that record to identify the events and the actions that take place during the call. These events and actions may be defined as complex customer/call center interactions, such as dropped calls, logic errors or angry exchanges. A call center administrator may also identify a set of metrics, such as the number of dropped calls that occur during a day or for each agent, the number of times a client was left on hold for more than two minutes, or other such metrics that may be monitored by the systems described herein. The data collected about these events and the resulting metrics may be stored in a database and provided to a call center administrator through a user interface that allows the administrator to browse through the collected metric data and directly review relevant portions of a call that are of interest to the administrator. This allows the administrator to identify quickly and directly the portions of calls that effect metrics established at the call center for providing the desired or established level of service.

Figure 1:
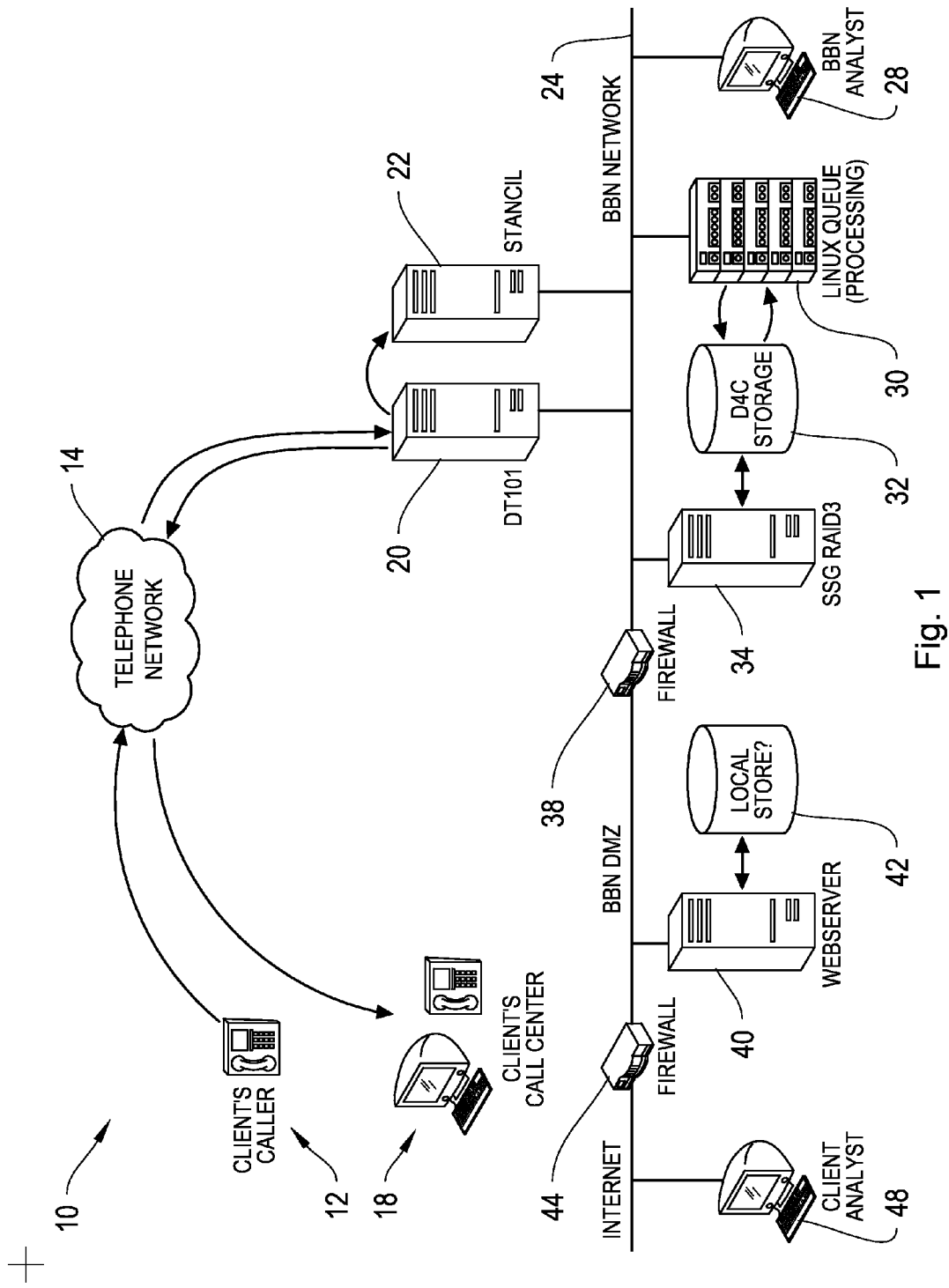
FIG. 1 depicts a system architecture for one system according to the invention.

More particularly, FIG. 1 depicts the system architecture of one system capable of allowing a call center administrator to set metrics of performance, measure the metrics by recording call data, and analyze events that result in the call center failing to meet the established metrics. The analysis may be achieved by finding a specific call or set of calls that gave way, at least in part, to below par performance, and allowing the administrator to access an audio record associated with that call; the record being annotated to show the occurrence of events of interest and allowing the administrator to go directly to the portion of the record that is of interest. To this end, FIG. 1 depicts an architecture of the system 10 including customer calling equipment 12, the telephone network 14, call center telephone equipment 18, a telephone network interface 20, an audio recorder 22, an analyst workstation 28, a data processor 30, a database 32, a database controller, such as a RAID controller 34, an optional firewall device 38, a web server 40, an annotated call database 42, a firewall 44 and a client analyst workstation 48.

The architecture of the system 10 depicted in FIG. 1 shows an architecture for a call center monitoring system that hooks into the telephone network to allow the monitoring system to connect into a telephone call occurring between a customer using the customer equipment 12 and the call center using the call center telephone equipment 18. To this end, the architecture 10 illustrates that a customer using the equipment 12 can call in through the telephone network 14 to the call center equipment 18. Typically, the client telephony equipment comprises a telephone handset, a mobile phone, or some other kind of equipment that transfers voice signals and audio signals over the telephone switch network 14. However, in alternate embodiments the systems and methods described herein may be modified to include gateways that allow the system to monitor calls that are occurring from customer equipment that might include VOIP telephony equipment, as well as data transmission devices, including video devices, such as computer work stations that allow the transfer of data over a network such as an IP data network.

In a typical situation the customer uses the telephony equipment 12 to call in through the network 14 to the call center 18. The call center 18 depicted in FIG. 1 is a conventional call center of the type that typically includes some interactive voice response (IVR) equipment that can use voice signals and audio instructions to prompt the customer and solicit certain information that might be helpful in answering any query that the customer may have. The call center 18 may also include a plurality of call agents typically being individuals sitting at a bank of phones and answering the phone calls as customers call in to ask questions of their account or warranties, or to ask for user support. Thus, the call center typically is some combination of IVR systems along with live agents networked together to provide a customer with the support they need.

In operating a call center, customer service efficiency is paramount. The call center wants to handle each call efficiently and accurately for the purposes of providing customers with the best call center experience possible as well as to provide the most efficient and cost effective service to that customer. In light of this, the call center typically has an administrator or several administrators that monitor the performance of the call center to make sure each customer experience is acceptable and to ensure that the systems and agents working at the call center are performing at an acceptable level of efficiency. To that end, call center administrators commonly listen in to the dialog between a customer calling in from equipment 12 to the call center 18. The administrators typically employ data recorders that couple into the call center equipment 18 and record at least portions of the conversation that a customer may have with a live agent as well as information about the performance of the IVR system.

In the system depicted in FIG. 1, the monitoring system is outside of the call center equipment 18 and includes a data converger 20 that hooks the monitoring system into the telephone network 14. In practice, the telephone company identifies incoming calls to the call center equipment 18 and routes or switches the call to the converger 20. That converger 20 grabs the call and begins recording the call with data recorder 22 and at the same time forwards the call back to the telephone network 14 to be switched through to the call center equipment 18. In this way, the customer has a complete circuit from their equipment 12 to the call center 18, with this circuit passing through the data converger 20. As such, the system shown in FIG. 1 connects into the call by coupling into a circuit on the telephone network wherein that circuit carries audio signals between the customer's equipment and the call center equipment 18. In other embodiments, the system may record a call by tapping into an observation port provided by the call center equipment 18, or may use recordings made on the call center premises with an audio recording on the trunk side or agent side of call center switch equipment, such as an ACD. However, it will be understood that the systems and methods described herein may use any suitable technique for recording a call and that the technique used will depend at least in part on the application and the equipment and resources available.

In the embodiment depicted in FIG. 1, the converger 20 can be any suitable converger of the type commonly employed for hooking into or connecting into a telephone call. In one embodiment depicted, the converger is a DirectTalk IVR platform programmed to dial into the call center and connect the caller's line to the line into the call center, however any suitable telephony equipment that allows for connecting into a call may be employed with the systems and methods described herein. Additionally, in those embodiments where the customer may be using telephony equipment 12 in combination with data equipment (not shown) such as a desktop workstation coupled to an IP network, the system shown in FIG. 1 may also include a data logger that receives copies of data transmissions sent from the customer's data equipment to the receiving data equipment at the call center site. Techniques for rerouting, or sending copies, of data packets over a network are well known in the art and any suitable technique may be employed without departing from the scope of the invention.

The recorder 22 connects to the converger 20, and the recorder 22 creates a digital record of the call. In one embodiment, the data recorder 22 is a conventional recorder of the type manufactured and sold by the Stancil Company. This recorder 22 will generate a digital representation of the audio wave form of the call, capturing the customer's voice signals, voice signals from a live agent at the call center 18, or at any other call center to which the customer is forwarded during the course of the call, as well as for capturing audio signals and digital tones generated by the client's telephony equipment 12, or generated by the IVR equipment that is part of the call center equipment 18 depicted in FIG. 1. Additionally and optionally, the system may include a recorder that records CTI signals, notes and actions taken by a live call agent or any other information that may be helpful to the call center administrator. Thus the depicted recorder 22 records characteristics of the call from end to end. The actual characteristics recorded may vary according to the application and the equipment available. In some embodiments, the recorder 22 will record the audio waveform of the call, however in other embodiments the recorder 22 may only record touch tones, volume, frequency ranges, power bands, or other features of the call. In any case, the recorder 22 will record those characteristics of the call that may be used to identify whether the events of interest have occurred during the call, and to provide characteristics, like frequency patterns, that may be used to identify the location of the event with record. For purposes of illustration and clarity the systems and methods of the invention will now be described with reference to a system that records the audio waveform of the call from end to end, however, this is merely provided as an example and is not to be deemed limiting in any way.

As shown in FIG. 1, the recorder 22 couples to the network 24. The data recorder 22 windows data to the RAID database 32. The database 32 is initially provided by the data recorder 22 with the raw audio data stored in a digital format suitable for signal processing by the data processor 30. Once the call has ended, the converger 20 can identify the signal indicating end of call and send an instruction to the recorder 22 to terminate recording and to mark end of call. This information may be stored within the database 32. Once the call has ended, either immediately after the call or at some time later during a batch process, the recorded audio record of the call from the beginning of the call to the end of the call may be analyzed by the data processor 30. The depicted database 32 can be any suitable database system, including the commercially available Microsoft Access database, and can be a local or distributed database system. The design and development of suitable database systems are described in McGovern et al., A Guide To Sybase and SQL Server, Addison-Wesley (1993). The database 32 can be supported by any suitable persistent data memory, such as a hard disk drive, the depicted RAID system, tape drive system, floppy diskette, or any other suitable system. The system depicted in FIG. 1 includes a database device 32 that is separate from the workstation platform 34, however, it will be understood by those of ordinary skill in the art that in other embodiments the database device 32 can be integrated into the system 34.

The data processor 30 may be a stack of Linux data processors capable of analyzing the audio records stored in the database 32 to identify within the audio records occurrences of one or more identified events that occurred during the recorded call. The depicted data processor 30 may be a conventional data processing platform such as an IBM PC-compatible computer running the Linux or Windows operating systems, or a SUN workstation running a Unix operating system. Alternatively, the data processor may comprise a processing system that includes an embedded programmable data processing system. Such an embedded processing system may be integrated, usually at the board level, into the telephony equipment of the converger 20, the call center equipment 18, into the PSTN equipment, or at some other point within the system depicted in FIG. 1. For example, the data processing system can comprise a single board computer system that has been integrated into a system for performing audio record processing to identify events within the audio record generated by the recorder 22. The single board computer (SBC) system can be any suitable SBC, including the SBCs sold by the Micro/Sys Company, which include microprocessors, data memory and program memory, as well as expandable bus configurations and an on-board operating system. The data processor 30 may perform a signal processing operation that identifies the occurrence of an event within the audio record. In one embodiment, a set of events has been defined, and audio wave forms have been associated with these events. Thus, an event such as a being on hold may be associated with an audio wave form or a class of audio wave forms that correlate to the hold music played by the call center equipment 18. In a later call analysis step, the data processor 30 may apply a correlator process that correlates the audio record with the audio wave form associated with the hold music, in those cases where the user is trying to determine whether a hold event occurred. The process for generating audio wave forms to associate with an event, as well as correlation processes suitable for use with the data processor 30 are known in the art, and described in Oppenheim et al., Digital Signal Processing Prentice-Hall (1975), the contents being incorporated by reference.

Figure 2:
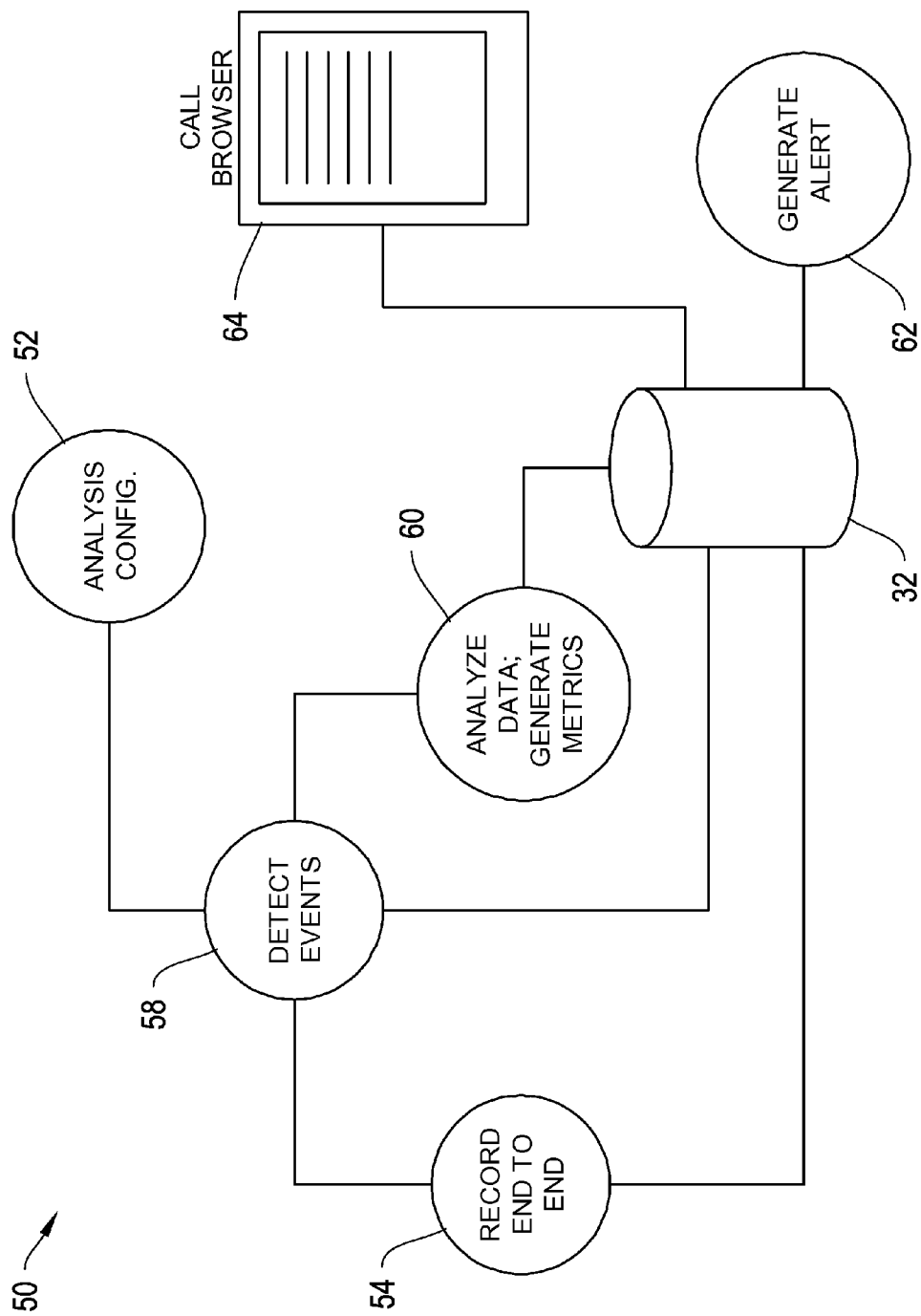
FIG. 2 is a state diagram depicting the database pipeline for generating annotated records of recorded calls.
Figure 3:
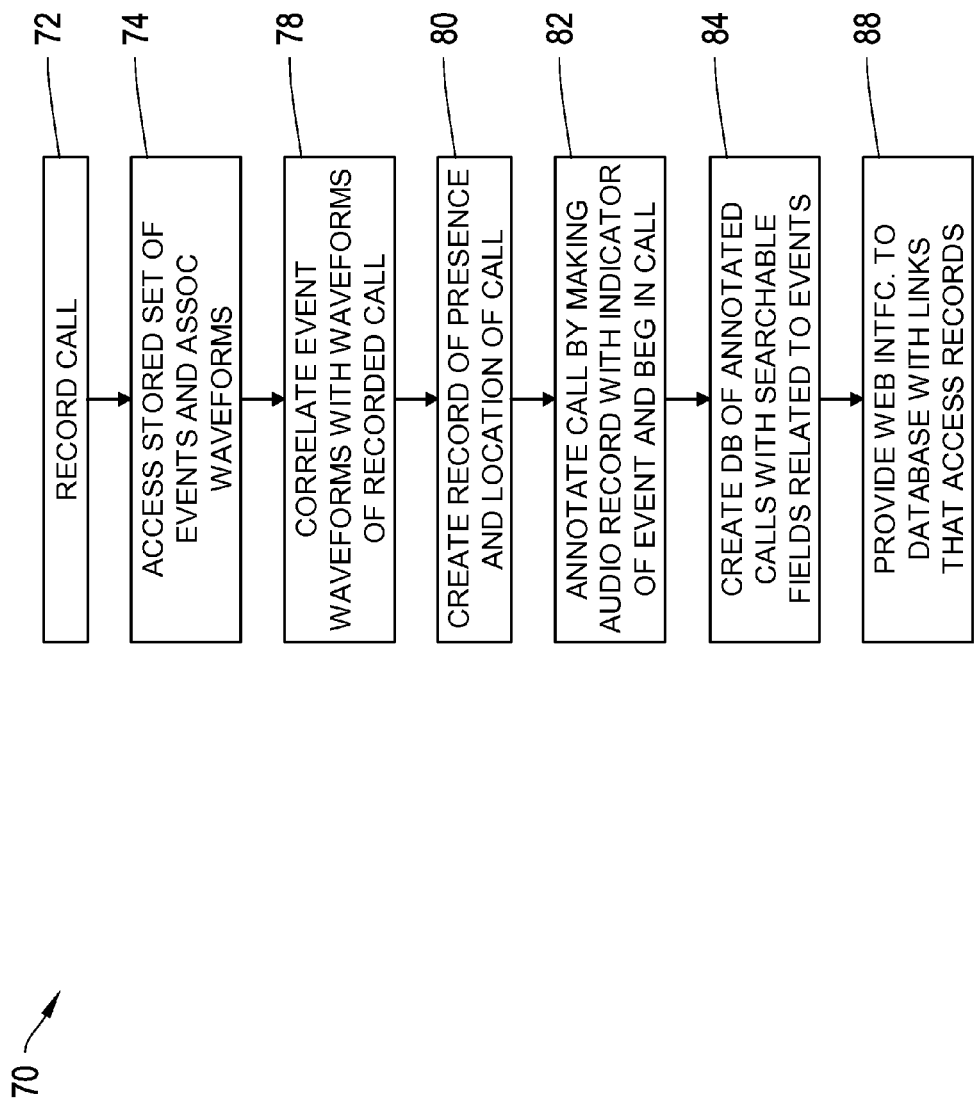
FIG. 3 depicts a flow chart diagram of one process for creating a database suitable for use with the system depicted in FIG. 1.

Turning to FIG. 2, there is depicted a database pipeline process 50 for processing the data stored within database 32 to mark the audio records stored within the database 32 with indicators that are representative of an occurrence of an identified event within a respective audio record. The indicator may be a tag stored in a field in a database, and used to indicate the presence and location of an event in an associated record. As shown in FIG. 1, the analyzed and marked audio records may be returned to the database 32 for storing, until it is time to generate a database that may be used for providing a data report to the call center administrator. In any case, FIG. 2 depicts one process by which the data processor 30 may create the database of marked audio records, however, any suitable process may be used for marking a record or otherwise associating the occurrence of an event within an audio record.

In particular, FIG. 2 depicts a process 50 that includes an analysis configuration step 52, a record end to-end step 54, an event detection step 58, an analyze data and generate metrics step 60 and an alert generation step 62. Also shown in FIG. 2 is that the process 50 may feed information into the database 32 which is accessible by a computer program to generate browsable data that a call center manager may employ to evaluate the design and performance of a call center.

As shown in FIG. 2, the process 50 includes an analysis configuration step 52. In this step, the process 50 configures the analysis that will be performed on the audio records created by the recorder 22 shown in FIG. 1. More particularly, in step 52 the events that will be identified within the audio record are selected, generated and stored to provide a set of patterns or pattern sequences that the process 50 may search for within the stored audio records.

To this end, the configuration process may include a step of identifying a series of events that are of interest. Typically these are significant events that can happen within a call and more typically for the systems and methods described herein the events being identified in step 52 relate to occurrences within a caller/call center dialogue that are relevant to performance metrics of interest to the call center administrator. However, the events selected will depend upon the application being addressed and any suitable event may be identified and selected for use by the process 50. Typical examples of significant events that can occur within a recorded call include events that may occur during the IVR-caller dialogue, such as system prompts and caller input, touch tone or speech, or other similar events. Also the events selected in step 52 may include events that occur during an agent/caller dialogue such as the exchange of various kinds information, for example account numbers, or dollar amounts, description of reasons for the call, such as questions about a bill or inquiries about a product, and completion of a transaction such as by making payment arrangements or ordering a product.

The events selected in step 52 lead to an understanding of call center performance, as that performance may be measured and quantified by system metrics set by the call center administrator. In this way, the call center administrator can develop a set of metrics that help quantify the usability and effectiveness of the call center. This information can supplement the standard interactive voice response performance reports that do not capture information on usability and that lack meaningful information as to the system level cause of usability problems. Thus, the event detected herein, along with the record of the event that may be later reviewed, allows a call center administrator to identify the specific problem, and develop a remedy.

Figure 4:
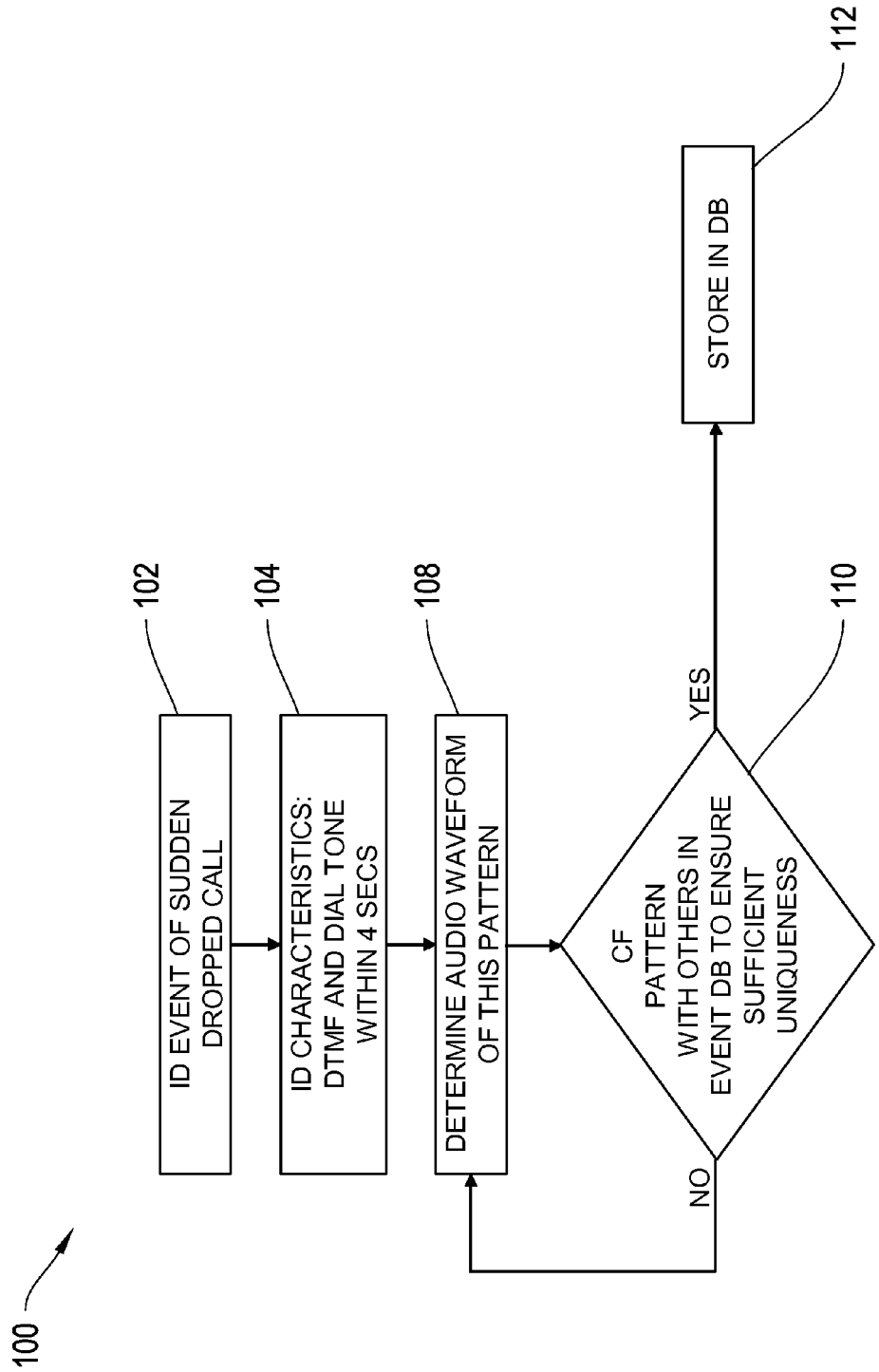
FIG. 4 depicts a flow chart diagram of one process for establishing identifiable characteristics of an event that may occur within a recorded call.

FIG. 4 illustrates one process 100 for selecting and characterizing an event. In the example shown in FIG. 4, the system 50 is being configured in step 52 to detect a dropped call event. A dropped call event may be understood as the unintended termination of a call into the call center. The call center administrator may set a metric of less than five dropped calls per day for the center. To monitor this metric, the system is configured to detect dropped calls within the recorded calls stored in the database 32. Thus, in step 102, the call administrator selects dropped calls as an event of interest.

To identify a dropped call event, the process 100 models the actions that characterize the dropped call event and associate those characteristics with data that can be found within the record, in this example an audio record, of the call. In step 104, the process 100 identifies characteristic of a dropped call in general. These characteristics can include an interaction wherein a caller responds to a prompt from an IVR system by entering one or more DTMF tones, expecting that the IVR system will respond to the tones by providing additional information for taking an action like transferring the caller to a live agent. In the dropped call scenario, a logic error may exist, such that in response to detecting the DMTF tones, the IVR system disconnects the caller and ends the call. This event may, in some cases, result in the audio record including the sound of a dial tone. Thus, in step 104, the process 100 determines a set of characteristics that may be associated with a dropped call event, preferably identifying characteristics that may be found within the audio record of the call. In those embodiments where the record includes other recorded characteristics of the call, such as CTI signals, the characteristics selected in step 104, may also include these features.

After step 104, the process 100 proceeds to step 108 where the process in this example identifies audio patterns that represent the above noted characteristics of a series of DTMF tones and the subsequent occurrence of a dial tone. In this way, the process 100 may include the probable sequence of patterns that, in combination and/or in sequence, identify the event. In the example depicted in FIG. 4, the process step 108 identifies a set of audio patterns that may be associated with the tones that will identify the characteristics selected in step 104.

In step 110 an optional procedure takes place, where the pattern generated in step 108 is compared to other patterns already being employed by the system. This reduces the likelihood that events will be falsely detected or confused with other events, when the audio record is analyzed. If the generated pattern is sufficiently unique, then the pattern is stored in step 112. Alternatively, the process 100 may return to step 108, and generate a new pattern that may be tested in step 110.

Thus, FIG. 4 illustrates that once the events of interest are selected, the process 100 identifies characteristics that are representative of each selected event and are associated with that event so that a pattern of information representative of the event is created for use by the process. Examples of such characteristics may be audio waveforms representative of speech, audio waveforms representative of music, audio spectra representative of silence, as well as characteristic power bands, volume bands, and frequency bands that may be used to identify touch tones, raised voices, or other events.

Additionally, when identifying an event of interest, the analysis configuration step 52 may include and store information that is representative of probable events and the sequences of those events which can be representative of a higher level event of interest. Such an example is the dropped call event discussed above. Thus, returning to FIG. 2, in step 52 the user may identify a dropped call as an event of interest, the user may also establish the metric of five dropped calls per day as representative of acceptable call center performance. These events and the associated identifiable characteristics of that event may be stored in a table such as Table 1, which may be stored in a database and subsequently used during the process 50 to determine whether a dropped call occurred during a particular caller-call center dialogue.

TABLE 1

| Event Name | Characteristics | Waveform |
| --- | --- | --- |
| Dropped Call | DMTF and subsequent dial tone | Pointer to waveform file |

After the analysis configuration step 52, the process 50 may in step 54 begin recording calls coming to the call center. As described above with reference to FIG. 1, a recording device 22 may be employed to record a call from end to end so that a complete record of the audio waveform is captured and stored. As shown in FIG. 2, the process 50 in step 54 records the call from end to end and as each call is completed the call may be stored as an audio record within database 32. In step 58 the process 50 may access one or more of the audio records stored within database 32 and begin a detect event operation.

In this step, the process 50 can access an event and the characteristics associated with that event which were developed during the analysis configuration step 52 and pass through an audio record to determine which, if any, of the events of interest can be found within the audio record. FIG. 5 depicts pictorially one example of a process for finding an event within an audio record. Specifically, FIG. 5 depicts a waveform pattern 120 that is stored within database 32 and associated with an event of interest, such as a dropped call event. That waveform may be correlated with the audio record waveform 122 and the correlation output 124 may indicate the presence as well as the location marks 126 of that event within the audio record 122.

As the events are found within the audio record, the process 50 in step 58 can mark the audio record with indicators that represent the occurrence of a particular event within that audio record. In this way, the process 50 annotates the audio record with data that is representative of the events that occurred during the call as well as the location within the call when the event occurred. This is illustrated in FIG. 2 by showing the process step 58 as storing information within the database 32. The information stored during step 58 will typically be the result of the event detection process which can include a list of those events which were found within a particular call and a location of those events within that call. This information may be stored along with the associated audio record that was analyzed in database 32 and used subsequently in step 60 during an analysis step. In this analysis step 60 the audio records as well as the events identified within those audio records may be processed to determine metrics earlier established by the call center administrator. For example the call center administrator may set a metric such as a maximum number of dropped calls to occur per day. Thus, in step 60 the process 50 can analyze the data stored within database 32 to determine the number of dropped call events that actually occurred for a particular day. This information can be organized and stored within the database 32.

As further shown in FIG. 2 the information stored in database 32 may be employed in step 62 to generate an alert to a call center administrator if a performance metric of interest is not being met or for any reason the call center administrator chooses to set the alert flag. Additionally, FIG. 2 depicts that the information stored in database 32 may be organized into a format suitable for display, typically over a web browser such as the depicted browser 64.

FIGS. 6-13 depict a user interface providing a view of data maintained by the system shown in FIG. 1.

More particularly, FIG. 6 depicts one example of a user interface that displays call data to a user, such as a call center administrator or analyst. The user interface depicted in FIG. 6 is a web interface of the type that may be generated by a web server such as the web server 40 depicted in FIG. 1. Accordingly, in this embodiment, the system depicted in FIG. 1 employs the web server 40 and associated database 42 to serve web pages to an analyst at work station 48 so that the analyst can parse through call data to determine the efficiency and usability of the call center.

FIG. 6 depicts a user interface that includes a data view 130 that is presented as a table having a number of fields 132A-132E. The user interface further includes a control element 134 that allows the user to direct the web server 40 to generate an alternate view that includes detailed information of the calls displayed in the data view 130.

In the data view 130 the data is organized in fields that include a Dialed Number Field 132A, a Date field 132B, a Day field 13C, and Hours of operation field 132D and a Call Number field 132E. The first line depicted in data view 130 includes a dialed number field that includes the dialed number 1-800-633-2273. This field 132A indicates the number at the call center that the customer reached. The fields 132B and 132C indicate the date and field 132D indicates whether the call came in during a time when the call center was opened or closed. Field 132E indicates the number of calls that came in on that dialed number during that day and during those hours.

Figure 7:
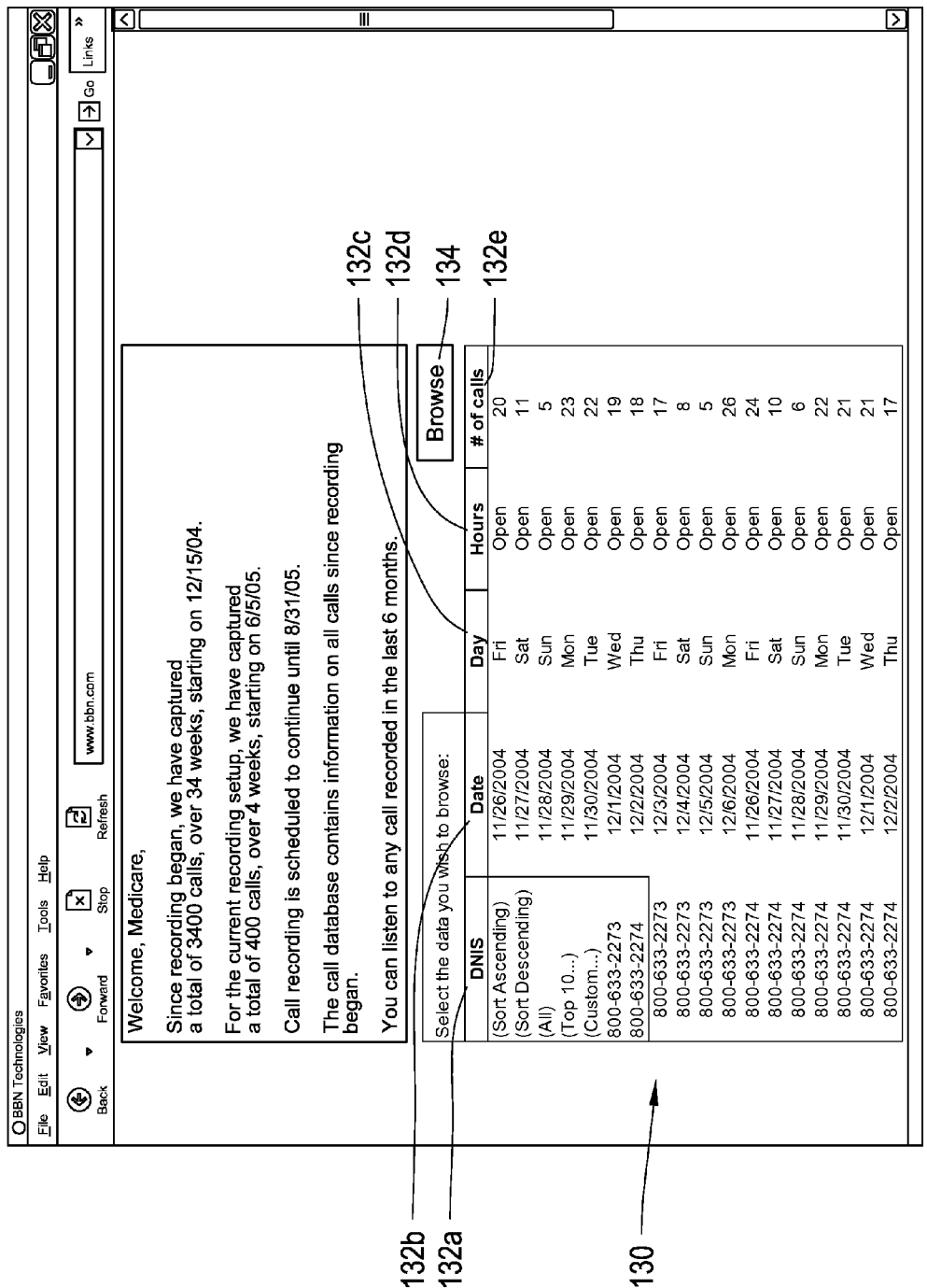
FIG. 7 depicts a sorting function provided by the user interface depicted in FIG. 6.

FIG. 7 depicts that the data in the data view 130 is sortable. In the embodiment depicted in FIG. 7 the fields 132A-132E are each presented in the user interface as a header which is an active link to a control the user can activate for sorting the data. In particular, FIG. 7 illustrates that the dialed number field 132A is presented under a header labeled DNIS that is also an active link that allows the user to choose among several options for sorting through the data presented in the data view 130. And as shown in FIG. 7 the user is presented with several options including sorting the data in an ascending order, selecting only those entries that are associated with the dialed number 1-800-633-2273 or 2274, or on some other characteristic of the data. In the example presented in FIGS. 6-13, the data in the data view 130 will be sorted to select only the call data stored in database 42 that is associated with dialed number ex. 2273.

Figure 9:
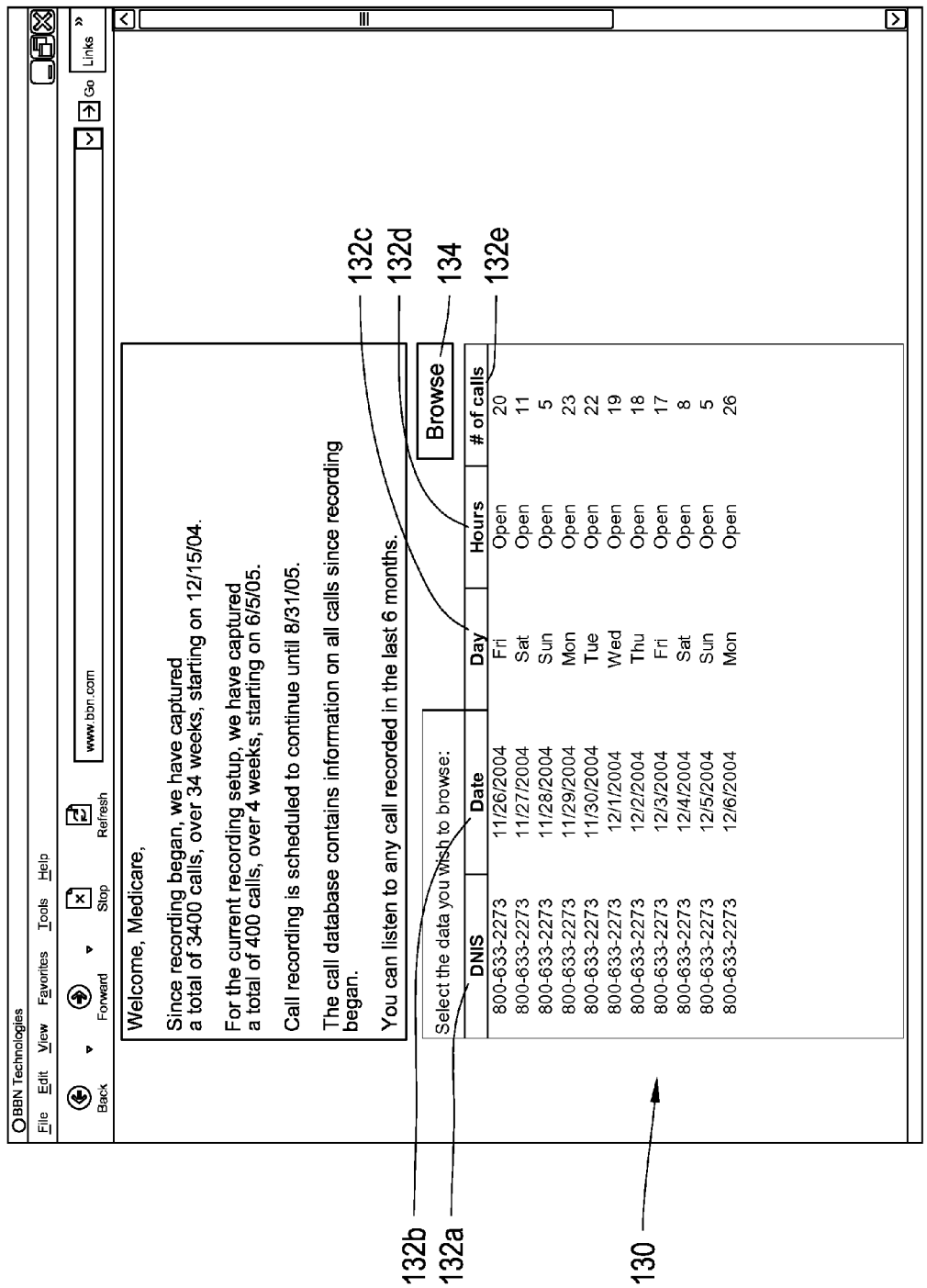
FIG. 9 depicts a selected dataset generated by using the sorting functions depicted in FIGS. 6-8.

FIG. 8 illustrates this sorting operation by showing the data view 130 in a changed state wherein only calls associated with dialed number 2273 are presented. FIG. 8 further depicts that the field 132D may be employed to sort the data based on various characteristics. In this example, the data is sorted so that only calls that came in during hours when the call center was closed are presented in the data view. This alternate view is illustrated in FIG. 9. FIG. 9 illustrates that by sorting through the data presented initially to the user, the user is able to identify those calls coming in on a certain dialed number that came into the call center after hours of operation. The call center administrator can use this information to determine the number of calls that actually come in after hours and then make an informed decision whether the hours of operation should be extended, the IVR system should be altered to more effectively or differently handle customers calling after hours, to determine whether there is a typical source of these after hours calls and other such information. Thus, in one aspect it will be understood that the systems and methods described herein allow the call center administrator to identify a set of metrics that provide meaningful measurements of call center's performance and/or usability. This allow the administrator to recognize that something is wrong and to identify, or at least more easily identify, the specific problems and remedies.

In the example depicted, the call center administrator may set metrics designed to determine how effective the call center is in meeting the needs of customers for flexible user support. In the process of FIGS. 6-13, the call center administrator may identify a set of metrics representative of whether the call center is sufficiently supporting customers, particularly those calling in during evening hours. In this particular example, the call center administrator is identifying metrics for determining whether the call center gives sufficient support to after business hours callers. These metrics can include, whether the call came into the call center after hours, and whether calls after hours are directed to topics that the 24 hour IVR service can address. They can include more complex metrics as well, including whether an after hours caller terminated the call as soon as they realized that live agents were not available.

To monitor these metrics, the call center administrator identifies an event, or series of events, such as an incoming call that occurs after business hours of the call center. These events may be detected and analyzed to determine values for the metrics of interest to the call center administrator. Thus, as described above, the call center administrator may identify a metric related to the number of dropped calls that occur at the call center. In selecting to establish a metric for the number of dropped calls, the call administrator may also identify a series of events that represent a dropped call and distinguish, or substantially distinguish, a dropped call from a voluntary call termination.

In the embodiment depicted in FIGS. 6-13, the call center administrator identifies a set of events that provide information and data for Measuring the metrics of interest. In doing this, the call center administrator may examine the operation and business processes of the center and define business hours of the call center as those hours of operation of the call center when live agents are available to answer calls. The call center may provide 24 hour IVR support, but the call center administrator define those hours of operation lacking live agent support and having only IVR support as "closed". Other events of interest may be whether the caller disconnected from the call before completing and IVR exchange, or whether the caller disconnected after hearing a recorded call indicating that no live agents were available at this hour. In any case, the call center administrator, or analyst, may select on or more events that may be detected within the audio record and that provide information relevant to the metrics being analyzed.

In one embodiment, the systems and methods described herein provide a toolkit that allows the call center administrator or the analyst to define metrics of interest and to associate one or more events or a sequence of events with that metric. To this end, the system may provide a user interface, such as a web interface that can receive input from the administrator or analyst so that the analysts may define a metric and then associate events with that metric. For example, in one practice the system may provide a user interface that allows a user to identify as a metric the maximum number of dropped calls that are allowed at the center per day. The user interface allows the administrator/analyst to designate a label—such as a dropped call—for the metric, set a numeric value, such as a maximum or a minimum, and associate with that designated label a sequence of events, where each event is represented as an identifiable characteristic of an audio record. The identifiable characteristic may be a set of frequencies associated with a dial tone, with a caller's voice, or with an IVR prompt. In alternate embodiments, the system may include a language model for doing topic recognition, or may include a behavioral model to determine the type of conversation taking place between the caller and the call center.

In one embodiment, the system includes a toolkit software program for allowing a call center administrator to establish a metric and associate one or more events with the established metric. For example, the system may provide a web based user interface that provides an HTML page to the call center administrator having fields that allow the administrator to enter a label for the metric being established. The user interface may further provide a set of fields or drop down dialog boxes that list events known to the system and available to the administrator to associate with the metric. The user can select the events to associate with the metric and the system will build a data model to define the metric for the system. The defined metrics, and optionally one or more of the events associated with metric may be displayed to the user as part of the user interface. For example, in FIGS. 6-13, the user interfaces include field codes that may present event or metric data to the call center administrator. The fields may be generated by a report generator of the type capable of generating web pages containing information and links, such as hypertext links, to information of interest. The report generator may create a browseable user interface that displays information representative of audio records of calls stored in the database and present active links, such as text links representing field names or call records, that can access scripts to perform functions like sorting or editing, or that includes links to the annotated record of the respective call. Other functions and capabilities may be provided within the browsable report, and these additional features are known to those of skill in the art. As will be described in below, the metric and event data may be analyzed by the user, including allowing the user to select audio records associated with events and metrics and performing a play back operation that allows the administrator to playback sections of the audio record that are directly related to events and metrics of interest.

Figure 10:
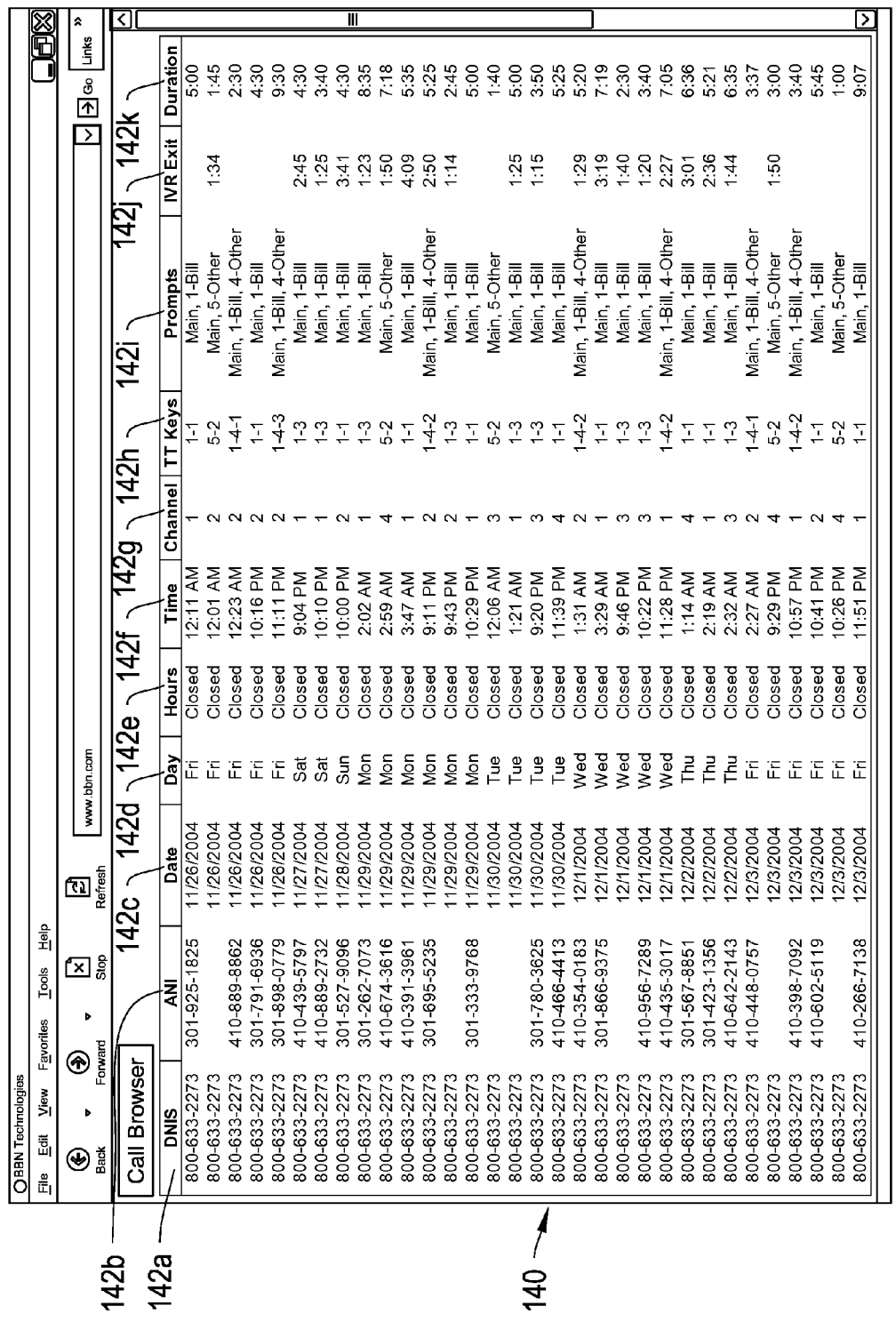
FIG. 10 depicts a user interface for allowing an analyst to browse through details of calls recorded and analyzed by the system depicted in FIG. 1.

The control 134 allows the user to review detailed information for each of the calls in the data set depicted in data view 130 of FIG. 9. FIG. 10 illustrates the expanded details that are provided in this alternate data view. The details in FIG. 10 can include several fields 142A through 142K. The fields in this case can also include events that were detected during the course of a call. This is illustrated in FIG. 10 by fields 142H and 142I that indicate certain touchtone keys were detected (142H), and certain prompts were detected (142I). The data in the example presented in FIG. 140 indicates that the majority of calls coming in after hours were related to billing matters as indicated by the prompt field 142I. This user interface provides a report of the events occurring during a respective one of the calls coming in to the call center. The report may be generated by a back end process operating on the web server 40 and accessing the database 42 that stores the plural annotated calls generated by the system. This information can help the call center administrator understand that the IVR system employed at the call center is to provide efficient service to customers after hours and is best suited to this by addressing billing inquiries that come in after hours of operation for the call center.

Figure 12:
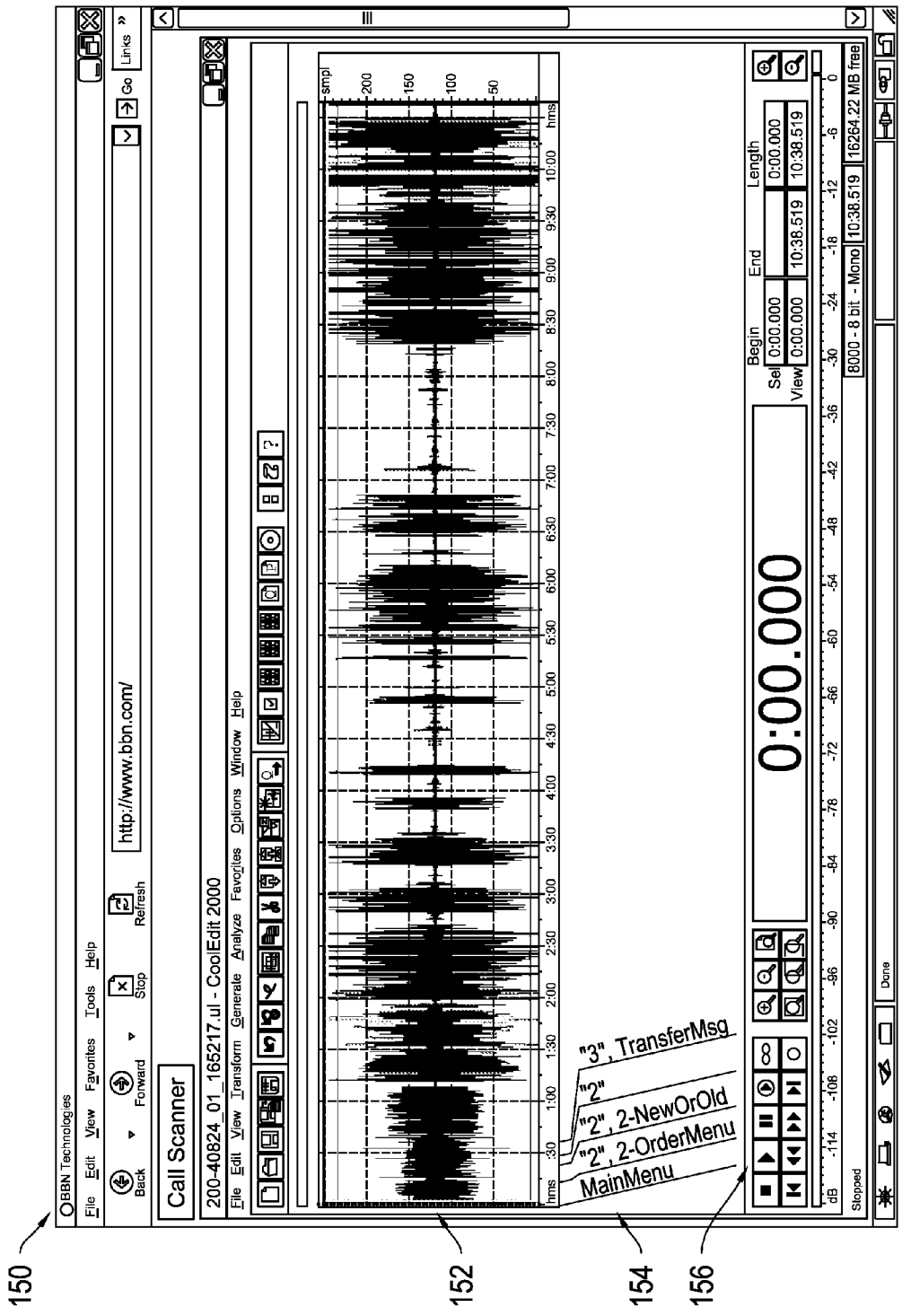
FIG. 12 depicts a user interface presenting a graphical depiction of a digital waveform representative of an audio call recorded by the system and annotated by the system to identify events occurring within the depicted audio record.
Figure 13:
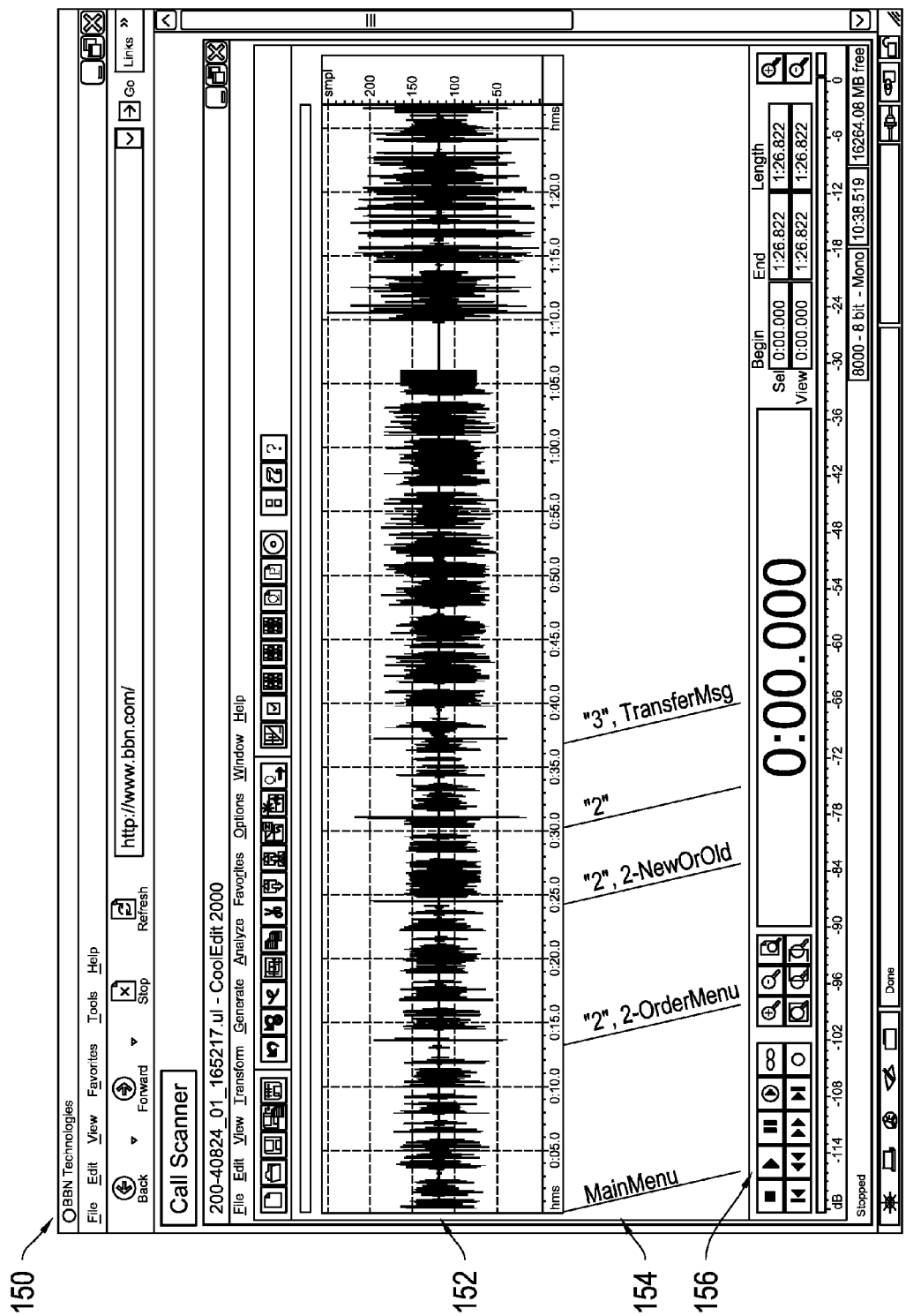
FIG. 13 depicts an expanded view of the section of the recorded call of interest to the analyst along with annotations made by the system and marked on the audio record for use by the analyst.

FIG. 11 illustrates that the call center administrator can sort on the various fields 142A through 142I. And in particular the hours field 142E is shown as an active control that the user can activate to receive a number of options for sorting the data presented in data view 140. FIG. 12 depicts that the user interface can provide detailed information of the record of each call, including the audio record. To this end, each of the entrees presented in the data view 140 of FIG. 11 and FIG. 10 may be understood as active links, typically hypertext links that provide controls to the web server 40 indicating a request for a web page that includes detailed information, including annotated wave form information, for the call associated with the respective link. FIG. 12 depicts an example of one such annotated record. The record 150 depicted in FIG. 12 includes a complete audio wave form for the call from end to end. This is presented in the wave form window 152. Below the wave form window 152 is the annotation window 154 that includes the annotations indicating different events which were detected within the call. These events can include the main menu prompt presented by the IVR equipment to the customer, prompts indicating requests for orders, transfers or other information. In the embodiment depicted in FIG. 12 the user interface 150 includes a set of controls 156 that allow the administrator to playback the audio associated with the wave form 152. In the embodiment depicted in FIG. 12 the cool edit program is employed to generate a wave form and the necessary controls to go ahead and play that wave form back to the call center administrator. This allows the call center administrator to hear the actual audio of what occurred during the call between the customer and the call center equipment 18. In the example depicted in FIG. 12 the majority of the events occurred during the first minute of the customer's call. The user interface in this embodiment allows the call center administrator to select that portion of the audio record that appears most relevant and expanded. This is illustrated in FIG. 13 which shows and expanded view of the fast minute that occurs during the call. It further shows that the annotation window 154 is similarly expanded and the events detected within the audio record are marked at the beginning of each of the events.

The user interface depicted in FIGS. 6-13 may be implemented by the system depicted in FIG. 1 that comprises a computer network and web server 40 system for supporting an interface and a report generator system as described herein. Each analyst can use a client station, such as the depicted client station 48. Each of the client stations 48 can be a conventional personal computer system, such as a PC compatible computer system that is equipped with a client process that can operate as a browser, such as the Netscape browser program that allows the client station to download computer files, such as web pages, from the server 40. In one embodiment, the web server 40 is configured as a conventional web server and the server 40 supports a backend process capable of accessing data from the database 42 and generating web pages using the accessed data that may be served to the client station 48. The HTTP server process can be any suitable server process including the Apache server. Suitable servers are known in the art and backend processes of the type that may be used with the server 40 can be developed following well known principles in the art, including those described in Jamsa, Internet Programming, Jamsa Press (1995), or described in Graham, HTML Sourcebook, Wiley Computer Publishing (1997) the teachings of which are herein incorporated by reference.

As discussed above, the call center monitoring and performance measuring system described above may be realized as a software component operating on a conventional data processing system such as a Unix workstation or set of workstations. In this embodiment, the call center monitoring and performance measuring system may be implemented as a C language computer program, or a computer program written in any high level language including C++, Fortran, Java or BASIC. Additionally, in an embodiment where microcontrollers or DSPs are employed, the call center monitoring and performance measuring system may be realized as a computer program written in microcode or written in a high level language and compiled down to microcode that can be executed on the platform employed. The development of such systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing (1983). It is noted that DSPs are particularly suited for implementing signal processing functions, including preprocessing functions such as image enhancement through adjustments in contrast, edge definition and brightness. Developing code for the DSP and microcontroller systems follows from principles well known in the art.

Those skilled in the art will know or be able to ascertain using no more than routine experimentation, many equivalents to the embodiments and practices described herein. For example, the systems described herein may monitor multiple call centers, using metrics that allow for comparing separate independent call centers. In such embodiments, the system may hook into calls coming into multiple separate call centers, and record and analyze the calls. The user may establish a set of metrics and each call center may have its performance analyzed against these metrics. The reports generated can compare a center's performance, to the performance of other centers, as well as the mean performance in general as well as for call centers of similar size and performing similar operations. Accordingly, it will be understood that the invention is not to be limited to the embodiments disclosed herein, but is to be understood from the following claims, which are to be interpreted as broadly as allowed under the law.

The invention claimed is:

1. A method for using a system to analyze a call having an audio record, comprising
having the audio record analyzed to identify occurrences of events, and
generating a browseable user interface including
a visual representation of an audio waveform of the call, wherein the audio waveform of the call is based on the audio record,
a first indicator selectable by a user configured to indicate a position on the audio waveform of the call,
a list of the identified events that occurred during the call, and
a second indicator selectable by the user and configured to indicate an event on the list of identified events.

2. A method according to claim 1, further including allowing the user to model the identified event as a characteristic audio pattern occurring during the audio record.

3. A method according to claim 2, further including determining whether the characteristic audio pattern is different from audio patterns in a database of stored audio patterns and subsequently storing the event.

4. A method according to claim 1, wherein at least one of the identified events comprises a speech event.

5. A method according to claim 1, wherein at least one of the identified events is included in a predetermined set of events.

6. A method according to claim 1, wherein at least one derived call property representative of a pattern of one or more events is associated with the call.

7. A method according to claim 6 further including generating, in the browseable user interface, a report representative of events that occurred during a plurality of calls, wherein the information in the report includes active links to the respective calls that are selectable by the user.

8. A method according to claim 7, including sorting the report into an order based on at least one of the following: a date of the call, a time of the call, a duration of the call, a telephone number, an agent ID number, or the derived call property.

9. A method according to claim 7, including filtering the report to show a subset of the plurality of calls based on at least one of the following: a date of the call, a time of the call, a duration of the call, a telephone number, and agent ID number, or the derived call property.

10. A method according to claim 6, wherein the derived call property is a performance metric representative of a measure of usability for a call center.

11. A system for analyzing a call having an audio record, comprising
a call analyzer configured to analyze the audio record to identify occurrences of events, and
a browseable user interface configured to include
a visual representation of an audio waveform of the call, wherein the audio waveform of the call is based on the audio record,
a first indicator selectable by a user configured to indicate a position on the audio waveform of the call,
a list of the identified events that occurred during the call, and
a second indicator selectable by the user and configured to indicate an event on the list of identified events.

12. A system according to claim 11, wherein the call analyzer is further configured to allow the user to model the identified event as a characteristic audio pattern occurring during the audio record.

13. A system according to claim 12, wherein the call analyzer is further configured to determine whether the characteristic audio pattern is different from audio patterns in a database of stored audio patterns and to subsequently store the event.

14. A system according to claim 11, wherein the call analyzer is further configured to identify speech events.

15. A system according to claim 11, wherein the call analyzer is further configured to identify events included in a set of predetermined events.

16. A system according to claim 11, wherein the call analyzer is further configured to associate at least one derived call property representative of a pattern of one or more events with the call.

17. A system according to claim 16, wherein the user interface is further configured to include a report representative of events that occurred during a plurality of calls, wherein the information in the report includes active links to the respective calls that are selectable by the user.

18. A system according to claim 17, wherein the user interface is further configured to sort the report based on at least one of the following: a date of the call, a time of the call, a duration of the call, a telephone number, an agent ID number, or the derived call property.

19. A system according to claim 17, wherein the user interface is further configured to filter the report to show a subset of the plurality of calls based on at least one of the following: a date of the call, a time of the call, a duration of the call, a telephone number, an agent ID number, or the derived call property.

20. A system according to claim 16, wherein the derived call property is a performance metric representative of a measure of usability for a call center.

21. A system according to claim 11, wherein the user interface is configured such that selection by the user of the first indicator results in an audio playback of a portion of the call that begins at the selected position of the audio waveform and ends after a predetermined period of time.

22. A system according to claim 11, wherein the user interface is configured such that selection by the user of the second indicator results in an audio playback of a portion of the call associated with the selected event, the portion beginning at a marked beginning and end of the selected event.

23. A system according to claim 11, wherein the first and second indicator are configured to move synchronously, wherein selection by the user of a position on the audio waveform using the first indicator will move the second indicator to the closest identified event, and selection by the user of an event using the second indicator will move the first indicator to a marked beginning of the event on the audio waveform.

24. A method according to claim 4, wherein the speech event includes at least one of a phrase, a tone of voice, a change in volume, or a period of silence.

* * * * *